United States Patent
Jiang

(12)
(10) Patent No.: US 6,184,323 B1
(45) Date of Patent: *Feb. 6, 2001

(54) POLYMERIZABLE COMPOSITIONS BASED ON DIFUNCTIONAL THIO(METH) ACRYLATE MONOMERS AND TRANSPARENT POLYMER COMPOSITIONS OBTAINED THEREFROM

(75) Inventor: Peiqi Jiang, Tokyo (JP)

(73) Assignee: Essilor International-Compagnie Generale d'Optique, Charenton Cedix (FR)

(*) Notice: Under 35 U.S.C. 154(b), the term of this patent shall be extended for 0 days.

This patent is subject to a terminal disclaimer.

(21) Appl. No.: 09/116,143

(22) Filed: Jul. 15, 1998

Related U.S. Application Data

(63) Continuation of application No. 08/651,283, filed on May 22, 1996, now abandoned.

(30) Foreign Application Priority Data

May 31, 1995 (FR) .................................................. 95 06443

(51) Int. Cl.[7] .................................................. C08F 228/02
(52) U.S. Cl. ............................................ 526/286; 528/376
(58) Field of Search ............................................... 526/286

(56) References Cited

U.S. PATENT DOCUMENTS

| | | | |
|---|---|---|---|
| 4,931,521 | * | 6/1990 | Matsuda .................. 526/286 |
| 5,442,022 | * | 8/1995 | Keita ..................... 526/309 |
| 5,741,831 | * | 4/1998 | Keita ..................... 523/106 |

FOREIGN PATENT DOCUMENTS

| | | |
|---|---|---|
| 40 10 783 | 10/1991 | (DE) . |
| 0 273 661 | 7/1988 | (EP) . |
| 0273710B1 | 7/1988 | (EP) . |
| 0394495A1 | 10/1990 | (EP) . |

OTHER PUBLICATIONS

JP 04068085 A, Tokuyama Soda KK, Derwent Publications.
JP 02210301 A2, Nippon Shokubai Kagaku Kogyo co., Ltd., Derwent Publications.

* cited by examiner

*Primary Examiner*—Christopher Henderson
(74) *Attorney, Agent, or Firm*—O'Keefe, Egan & Peterman

(57) ABSTRACT

The composition includes, based on the total weight of polymerizable monomers present in the composition:

a) 10 to 70% by weight of a difunctional thio(meth) acrylate monomer, of formula (I):

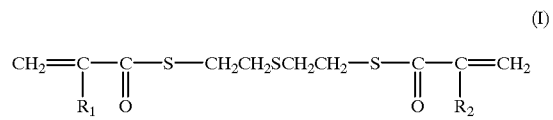

in which $R_1$ and $R_2$ denote a hydrogen atom or a radical —$CH_3$,
or of a mixture of at least one monomer of formula (I) with at least one monomer of formula (II):

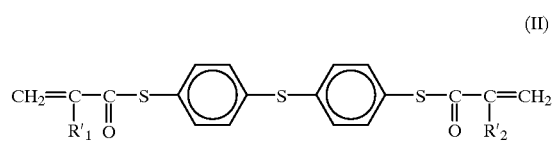

in which $R'_1$ and $R'_2$ denote a hydrogen atom or a radical —$CH_3$;

b) 10 to 60% by weight of at least one monomer of formula (III):

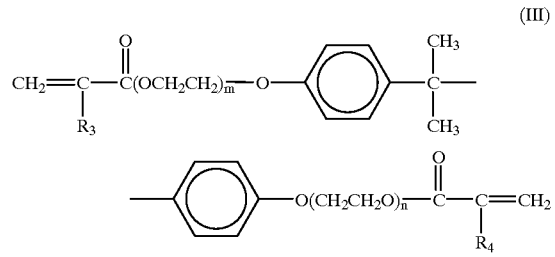

in which $R_3$ and $R_4$ denote a hydrogen atom or a radical —$CH_3$ and $O \leq m + n \leq 10$; and c) 5 to 30% by weight of at least one aromatic or polycyclane mono(meth)acrylate monomer.

22 Claims, No Drawings

POLYMERIZABLE COMPOSITIONS BASED ON DIFUNCTIONAL THIO(METH) ACRYLATE MONOMERS AND TRANSPARENT POLYMER COMPOSITIONS OBTAINED THEREFROM

This application is a continuation of 08/651,283 filed May 22, 1996 now abandoned.

FIELD OF THE INVENTION

The present invention relates, in general, to polymerizable compositions based on thio(meth)acrylate monomers, producing transparent polymer compositions exhibiting the properties which are required for their application in the field of ophthalmics.

BACKGROUND OF THE INVENTION

It has long been known to employ organic polymer materials for obtaining ophthalmic lenses.

One of the materials most commonly employed is obtained by polymerization of the monomer CR 39200 (diethylene glycol diallyl carbonate).

However, for a number of years, there has been an increasing demand for lenses which, while guaranteeing substantially the same optical qualities and the same mechanical characteristics as the lenses made of known organic polymer material, are thinner and are therefore lighter in weight.

Various materials have been developed to meet this demand. These new organic materials generally have high refractive indices which can reach, or even exceed, refractive indices n=1.6.

Thus, as a result of this high refractive index, it is possible to manufacture lenses of lower thickness for an equivalent corrective power (optical power).

A class of monomers that have recently been tested for obtaining materials in ophthalmics is the class of thio(meth) acrylates.

Patent EP-A-273 661 describes monomers of thio(meth) acrylate type which can be used in the field of ophthalmic optics, and patent EP-A-273 710 describes polymerizable compositions producing transparent organic polymers which are suitable for the production of ophthalmic lenses. These compositions contain a monomer which has at least one thio(meth)acryloyl group and at least two (meth)acryloyl groups and, optionally, at least one other monomer which is copolymerizable by a radical route.

Patent EP-A-273 710 describes in particular compositions based on bis(2-methacryloylthioethyl) sulfide.

This patent also mentions that the polymerizable compositions can be polymerized by a thermal route, by UV irradiation or by the action of an electron beam.

All the compositions given by way of example in this patent are polymerized either by a purely thermal route (for several hours), or by prepolymerization using UV irradiation followed by a thermal polymerization to obtain a hardened moulded article.

Patent application WO-90/04587 describes 4,4'-bis [(meth)acryloylthiophenyl] sulfide monomers and their use in poymerizable compositions in combination with a copolymerizable vinyl monomer and/or polythiols.

SUMMARY OF THE INVENTION

It would therefore be desirable to produce polymerizable compositions making it possible to obtain transparent hardened polymer compositions exhibiting all the properties that are required for an application in ophthalmic optics.

It would be desirable, in particular, to produce polymerizable compositions resulting in hardened polymer compositions exhibiting high transparency and refractive index, for example a refractive index higher than 1.55 and preferably of the order of 1.6, a high abbe number, a low density, good colourability and good impact strength.

It would also be desirable that the hardened polymer compositions should stand up well to ageing and in particular should have a good resistance to degradation by ultraviolet radiation.

It would also be desirable to obtain polymerizable compositions producing transparent polymer compositions which are useful in ophthalmic optics, which can be photopolymerized in very short periods of time, for example with irradiation times of the order of 3 to 5 minutes.

Such a very short period of time for forming and hardening the polymer composition starting from polymerizable compositions is an advantage that is of particular interest in an industrial content, since it enables the manufacturing time to be appreciably reduced and the production efficiency to be increased.

As mentioned previously, optical and ophthalmic articles made from the compositions according to the invention shall exhibit a high transparency. Transparency may be evaluated by determining visually the absence of diffusion areas within the article and its yellow index. The lower is the yellow index (YI), the higher is the transparency of the article.

The objective of the present invention is therefore to produce polymerizable compositions which have the above mentioned advantages and in particular which can be photopolymerized in a very short time.

A further objective of the present invention is to formulate polymerisable compositions which result in optical and ophthalmic moulded articles having high transparency as quantified by the absence of diffusion areas and lower yellow indices (YI).

Another objective of the present invention is the polymer compositions obtained by polymerization of the polymerizable compositions. Another objective of the present invention is the optical articles manufactured from polymer compositions.

The above objectives are attained, according to the invention, by producing a polymerizable composition comprising, based on the total weight of polymerizable monomers present in the composition:

a) 10 to 70% by weight of a difunctional thio(meth) acrylate monomer, of formula (I):

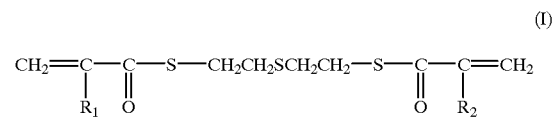

in which $R_1$ and $R_2$ denote a hydrogen atom or a radical —$CH_3$, or of a mixture of at least one monomer of formula (I) with at least one monomer of formula (II):

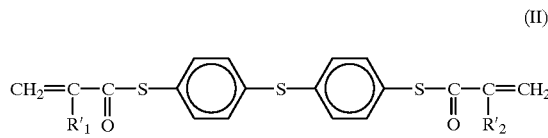
(II)

in which R'$_1$ and R'$_2$ denote a hydrogen atom or a radical —CH$_3$;

b) 10 to 60% by weight of at least one monomer of formula (III):

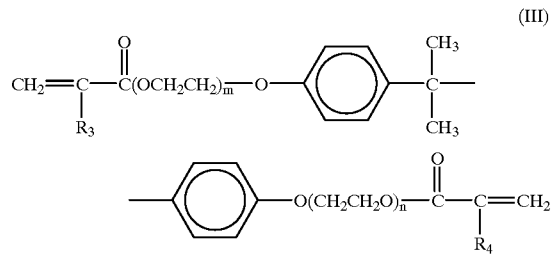
(III)

in which R$_3$ and R$_4$ denote a hydrogen atom or a radical —CH$_3$ and $0 \leq m+n \leq 10$; and c) 5 to 30% by weight of at least one aromatic or polycyclane mono(meth)acrylate monomer.

The composition of the invention may further comprise, based on the total weight of polymerizable monomers present in composition:

d) up to 15% by weight of a polyalkylene glycol di(meth) acrylate; and/or e) up to 15% and preferably up to 10% by weight of a polythiol R(SH)$_n$, in which n is an integer varying from 2 to 6 and preferably from 2 to 3, R is an organic group of valency equal to n, or a mixture of these polythiols.

In a preferred embodiment of the invention, the composition comprises, based on the total weight of polymerizable monomers present in the composition:

a) 10 to 70% by weight of a difunctional thio(meth) acrylate monomer, of formula (I):

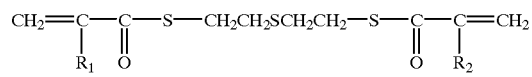
(I)

in which R$_1$ and R$_2$ denote a hydrogen atom or a radical —CH$_3$, or of a mixture of at least one monomer of formula (I) with at least one monomer of formula (II):

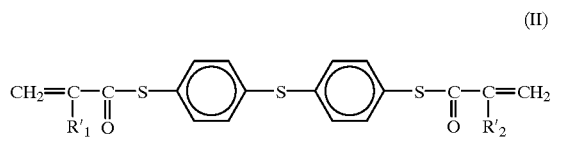
(II)

in which R'$_1$ and R'$_2$ denote a hydrogen atom or a radical —CH$_3$;

b) 10 to 60% by weight of at least one monomer of formula (III):

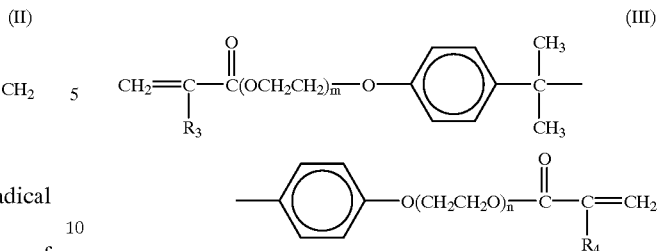
(III)

in which R$_3$ and R$_4$ denote a hydrogen atom or a radical —CH$_3$ and $0 \leq m+n \leq 10$; and c) 5 to 30% by weight of at least one aromatic or polycyclane mono(meth)acrylate monomer, and e) 1 to 10% by weight, preferably 5 to 10% by weight of a polythiol R(SH)$_n$, in which n is an integer varying from 2 to 6 and preferably from 2 to 3, R is an organic group of valency equal to n, or a mixture of these polythiols.

In the constituents a), the monomer of formula (I) is preferably bis(2-methacryloylthioethyl) sulfide and the monomer of formula (II) is bis(4-methacryloylthiophenyl) sulfide.

The constituent a) of the polymerizable composition according to the invention also preferably represents 20 to 60% by weight relative to the total weight of the components a) to e).

In the constituent a), the monomer of formula (I) is also preferably the major monomer and preferably represents between 50 and 100% by weight of the constituent a).

The monomers of formula (III) of the constituent b) which are recommended are 2,2-bis[4-(meth)acryloyloxyphenyl] propane, 2,2-bis-4-(ω-(meth) acryloyloxypolyethoxy) phenyl]propane and in particular the monomers of formula (II) in which R$_3$=R$_4$=CH$_3$ and m+n=2.6 (EBADMA), m+n=4 (DBADMA) and m+n=10 (OBADMA).

Furthermore, in order to obtain all of the advantageous characteristics of the invention it is preferable that the constituents a) and b) should together represent between 60 and 95% by weight relative to the total weight of the constituents a) to e).

The monomers of the constituent c) are preferably chosen from the monomers of formula (IV):

(IV)

in which R$_5$ denotes hydrogen or a radical —CH$_3$, and R$_6$ denotes a radical:

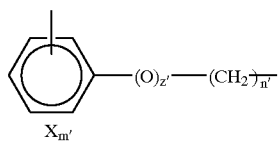

in which n' is an integer from 0 to 3, m' is an integer from 0 to 5, z' is equal to 0 or 1, on condition that z' is equal to 0 when n' is equal to 0 and x denotes a chlorine or bromine atom, or a mixture of these monomers.

Among the polycyclane mono(meth)acrylate monomers of the constituent c) of the polymerizable composition according to the invention there may be mentioned cyclohexyl (meth)acrylate, methylcyclohexyl (meth)acrylate, (iso)bornyl (meth)acrylate, adamantyl (meth)acrylate and the like and the methacrylic esters marketed by the company Hitachi Chemical Corporation under the name FA513M.

The recommended cyclanic mono(meth)acrylate monomer is (iso)bornyl (meth)acrylate.

Among the aromatic mono(meth)acrylate monomers of the constituent c) of the poymerizable compositions according to the present invention there may be mentioned phenyl (meth)acrylate, benzyl (meth)acrylate, 1-naphthyl (meth)acrylate, fluorophenyl (meth)acrylate, chlorophenyl (meth)acrylate, bromophenyl (meth)acrylate, tibromophenyl (meth)acrylate, methoxyphenyl (meth)acrylate, cyanophenyl (meth)acrylate, biphenyl (meth)acrylate, bromobenzyl (meth)acrylate, tribromobenzyl (meth)acrylate, bromobenzylethoxy (meth)acrylate, tribromobenzylethoxy (meth)acrylate, phenoxyethyl (meth)acrylate and mixtures thereof.

The recommended aromatic mono(meth)acrylate monomers are tribromobenzyl acrylate (TBrBA), tribromobenzylethoxy acrylate (TBrBEA), benzyl methacrylate (BM), phenyl methacrylate (BZ) and phenoxyethyl acrylate (AMP).

Mono(meth)acrylates which do not contain halogen atoms will give polymers having a very low yellowness index.

As indicated, the polymerizable compositions according to the invention may optionally contain up to 15% by weight of a polyalkylene glycol di(meth)acrylate.

Among these polyalkylene glycol di(meth)acrylates which can be used in the present invention, there may be mentioned polyethylene glycol di(meth)acrylate, polypropylene glycol di(meth)acrylate and polybutylene glycol di(meth)acrylate.

It is recommended to employ preferably polybutylene glycol di(meth)acrylate.

When the optional constituent d) is employed in the polymerizable compositions according to the invention it is desirable, in order to obtain the highest refractive indices, that the constituent c) should in this case be an aromatic mono(meth)acrylate monomer and preferably an aromatic mono(meth)acrylate monomer carrying halogen groups.

Among the polythiols of the constituent e) of the compositions according to the present invention, there may be mentioned those described in patent EP-A-394 495 and the polythiols corresponding to the following formulae:

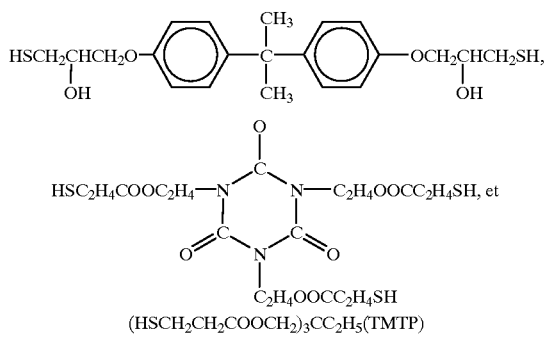

It is also possible to employ mixtures of these polythiols.

The addition of the polythiol or a mixture of these polythiols makes it possible in particular to improve the impact strength of the glasses according to the invention and to significantly reduce their yellow indices.

The polymerizable compositions according to the invention which are defined above may also contain other polymerizable comonomers, up to 10% by weight relative to the total weight of the constituents a) to e) and the presence of which does not modify the overall properties of the final polymer compositions.

However, it is preferable that the constituents a) to e) should be the only monomers in the compositions.

The polymerizable compositions according to the invention may also include additives which are conventionally employed in polymerizable compositions intended for moulding optical articles, in particular ophthalmic lenses, in conventional proportions, namely inhibitors, dyes, UV absorbers, perfumes, deodorants, antioxidants and antiyellowing agents.

The perfumes allow the odor of the compositions to be masked, in particular during surfacing or routering operations.

In fact, articles which are moulded from the polymerizable compositions according to the invention can, during surfacing or routering operations, give off odours due to the presence of sulphur compounds (for example BMATES and BMATPS).

These odours can be considerably limited by resorting to the introduction of perfumes into the base polymerizable composition. This technique is described, for example, in patent application JP-90 210 301A.

Another known technique for removing odours from the polymerizable compositions during surfacing or routering operations is described in patent applications JP-04 068 085 and JP-61 099010, and consists in employing, during these operations, a coolant solution containing a perfume and/or a deodorant.

It is also possible and often even preferable, to employ both these techniques in combination.

It has also been found, in accordance with the invention that it was possible to reduce the odours considerably during subsequent operations on the articles which are moulded from the polymerizable composition according to the invention when using, as sulphur-containing monomers, a mixture of BMATES and of BMATPS in which the proportion of the BMATES is lower than or equal to 30% by weight relative to the total weight of the components a) to e), and preferably lower than or equal to 20% by weight.

The compositions according to the invention also generally include polymerisation initiators, preferably photoinitiators, in proportions of 0.001 to 5% by weight relative to the total weight of the constituents a) to e), and more preferably from 0.01 to 1%.

The photoinitiators that can be employed in the polymerizable compositions according to the invention are, in particular, 2,4,6-trimethylbenzoyldiphenylphosphine oxide, 1-hydroxycyclohexyl phenyl ketone, 2,2-dimethoxy-1,2-diphenylethan-1-one and alkylbenzoin ethers.

The recommended photoinitiators are 1-hydroxycyclohexyl phenyl ketone and 2,4,6-trimethylbenzoyl diphenylphosphine oxide.

The present invention also relates to transparent polymer compositions obtained by polymerization, and in particular by photopolymerization, of the polymerizable compositions described above.

The polymerization is performed in a known manner by employing an initial mixture containing the various monomers of the polymerizable composition and the optional adjuvants, the polymerization reaction being capable of being catalyzed by employing catalysts such as benzoyl peroxides, cyclohexyl peroxydicarbonate, diisopropyl peroxydicarbonate or 2,2'-azobisbutyronitrile.

Preferably, too, this photopolymerisation is a photopolymerisation by irradiation with ultraviolet light.

The invention also relates to optical articles manufactured from polymer compositions according to the invention, and in particular, of ophthalmic lenses.

Ophthalmic lenses can be obtained in their definitive form by casting of the polymerizable compositions between two moulds which have the required surface geometries, followed by polymerization. A lens whose two faces are in the final state is then obtained.

It is also possible to manufacture semi-finished lenses comprising, after moulding, only one face with its final geometry, it being then possible for the second face to be surfaced as needed.

DESCRIPTION OF PREFERRED EMBODIMENTS

The following examples are intended to illustrate the invention without, however, being limiting in nature.

Unless stated otherwise, all the proportions of the constituents in the examples are expressed by weight.

EXAMPLES 1 TO 11

The photopolymerizable compositions were prepared by mixing the constituents shown in Table I below, in the proportions indicated in this table and by stirring the mixtures at 40° C. The weight percentages of the photoinitiators are percentages relative to the total weight of the constituents a), b), c), d) and e). The mixtures were then filtered and degassed. Lenses were manufactured from these polymerizable compositions by casting the liquid obtained in a mould which had a variable center thickness, consisting of two parts of a mould made of mineral glass which were held together by an adhesive tape at their periphery. When it is not specified, the thickness is 1.5 mm. The moulds were then irradiated on both sides with a radiation of 80 W/cm² produced by ultraviolet lamps for approximately 3 minutes.

After this treatment, the lenses formed were demoulded and subjected to a postcure (annealing) at 120° C. for 2 hours.

The following properties of the lenses obtained were then examined: transmission, refractive index, Abbe number, optical quality of the surface, impact strength and temperature resistance. The optical accuracy was assessed visually, O denoting a faultless surface and X a surface exhibiting defects. The impact strength was determined by the drop of a metal ball weighing 16 g (Examples 1 to 10) or 22 g (Example 11) from a height of 1.27 m, in the centre of the lens, according to the Food and Drug Administration method. The thickness in the centre of the lens is shown between brackets. O means that the lens is intact after the drop of a ball in the case of the corresponding central thickness.

Stresses are evaluated by observing the lens visually under polarized light.

O means the absence of stress.

X means the presence of stresses.

The temperature resistance is determined by studying the lenses before and after postcure.

Absence of geometrical deformation O.

Presence of deformations X.

The yellow index (YI) is determined spectrocospically and visually. A standarised method is used to determine the yellow index by the spectroscopic method (ASTM-D-1925-63). The yellow index is defined as follows:

$$YI = \frac{(127.5X - 105.8Z)}{Y}$$

where X, Y and Z are thrichromatic coordinates of the sample measured using a UV-visible spectrophotometer scanning the spectrum from 380 to 780 nanometers. YI is determined before and/or after annealing of the sample.

The visual method uses four standard glass samples containing increasing quantities of yellow dye to establish a range of yellows. Samples are classified according to their respective levels of yellow.

The results are given in Table I below.

TABLE I

| Compounds (g) | 1 | 2 | 3 | 4 | 5 | 6 | 7 | 8 | 9 | 10 | 11 |
|---|---|---|---|---|---|---|---|---|---|---|---|
| a) BMATES | 40 | 40 | 20 | 60 | 35 | 33 | 30 | 40 | 20 | 21 | 21 |
| BMATPS | — | — | 20 | — | — | — | — | — | 6 | 10 | 10 |
| b) EBADMA | 30 | 30 | 30 | 30 | 55 | 32 | 40 | 22 | 40 | 32 | 24 |
| DBADMA | — | — | — | — | — | 10 | 15 | 20 | — | — | — |
| OBADMA | — | — | — | — | — | 10 | — | — | 24 | 25 | 28 |
| c) TBrBA | 20 | — | — | — | — | — | — | — | — | — | 11 |
| TBrEBA | — | 20 | — | — | 5 | — | — | 8 | 10 | 12 | — |
| BM | — | — | — | — | — | — | 9 | — | — | — | — |
| BZ | — | — | 20 | — | 5 | — | — | — | — | — | — |
| FA 513 | — | — | — | 5 | — | 10 | — | — | — | — | — |
| AMP | — | — | — | — | — | — | — | 10 | — | — | — |
| d) BPOMA | 10 | 10 | 10 | 5 | — | — | — | — | — | — | — |
| e) TMTP | — | — | — | — | — | — | — | — | — | — | 6 |
| f) R604 | — | — | — | — | — | 5 | 9 | — | — | — | — |
| Irgacure 184 | 0.2 | 0.2 | 0.2 | 0.2 | 0.05 | 0.05 | 0.05 | 0.05 | 0.05 | 0.035 | 0.035 |
| TPO | 0.2 | 0.2 | 0.2 | 0.2 | 0.1 | 0.08 | 0.08 | 0.08 | 0.065 | 0.065 | 0.07 |
| Properties | | | | | | | | | | | |
| Surface accuracy | O | O | O | O | O | O | O | O | O | O | O |
| Transmission (%) | 90 | 90 | 89 | 90 | 91 | 90 | 90 | 90 | 89–90 | 89–90 | 90 |
| Refractive index | 1.5935 | 1.5918 | 1.5959 | 1.5936 | 1.5910 | 1.580 | 1.578 | 1.592 | 1.586 | 1.591 | 1.593 |
| Abbe number | 40.1 | 43.5 | 33.9 | 40.7 | 43.5 | 37.5 | 39 | 36 | 36 | 34 | 35 |

TABLE I-continued

| Compounds (g) | 1 | 2 | 3 | 4 | 5 | 6 | 7 | 8 | 9 | 10 | 11 |
|---|---|---|---|---|---|---|---|---|---|---|---|
| Density | 1.358 | 1.347 | 1.2248 | 1.2485 | 1.2713 | 1.21 | 1.23 | 1.29 | 1.29 | 1.30 | 1.29 |
| YI after annealing | — | — | — | — | 1.21 | 1.17 | 1.20 | 1.19 | — | — | — |
| Stresses | O | O | O | O | | | | | | | |
| Impact strength | | | | | 0(1.25 mm) | 0(1.30 mm) | 0(1.10 mm) | 0(1.10 mm) | 0(1.5 mm) | 0(1.5 mm) | 0 (1.30 mm) |
| Temperature Resistance | | | | | | | | | Very good | Very good | |

| | |
|---|---|
| BMATES | bis [(2-methacryloylthio)ethyl] sulfide |
| BMATPS | bis [(4-methacryloylthio)phenyl] sulfide |
| TBrBA | tribromobenzyl acrylate |
| TBrEBA | tribromobenzylethoxyacrylate |
| BM | benzyl methacrylate |
| BZ | phenyl methacrylate |
| AMP | phenoxyethyl acrylate |
| Irgacure ® 184 | 1-hydroxycyclohexyl phenyl ketone |
| TPO | 2,4,6-trimethylbenzoyldiphenylphosphine |
| EBADMA | Compound of formula (III) with $R_3 = CH_3$, $R_4 = CH_3$, $m + n = 2.6$ |
| DBADMA | Compound of formula (III) with $R_3 = CH_3$, $R_4 = CH_3$, $m + n = 4$ |
| OBADMA | Compound of formula (III) with $R_3 = CH_3$, $R_4 = CH_3$, $m + n = 10$ |
| BPOMA | Polybutyleneglycol dimethacrylate |

FA 513

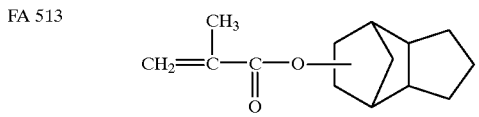

R604

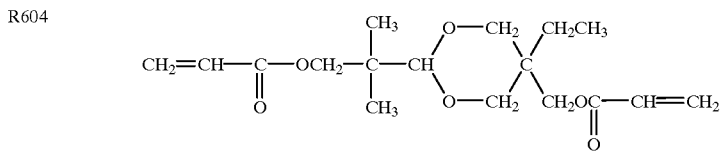

COMPARATIVE EXAMPLE A

A composition corresponding to Example 19 of Table III of patent EP-A-273 710 and which included:

BMATES 50% by weight

Styrene 40% by weight

Acrylonitrile 10% by weight was prepared as shown for the above examples.

This composition is called Composition 1' hereinbelow.

The same photoinitiators as those employed in the compositions of the invention were added to this composition, in the following proportions:

TPO 0.08% by weight

Irgacure® 184 0.05% by weight (The weight percentages of photoinitiators are calculated relative to the total weight of the monomeric constituents of the composition).

This composition was subjected to a polymerization and a hardening operation using ultraviolet light in the same conditions as Examples 1 to 10, that is to say by employing an ultraviolet light lamp giving an irradiation of 80 W/cm² and an exposure of 3 minutes on the two faces.

The following results were obtained:

a) after a prepolymerization of 10 seconds, the composition 1' is still in the liquid state.

b) after a polymerization of 3 minutes, the composition 1' is still in the gel state.

On the other hand, in the case of a prepolymerization performed in identical conditions, the composition of Example 6 of the invention a) after 10 seconds of the prepolymerization is in the form of gel, b) is hardened and is in the form of a lens which can be demoulded after 3 minutes.

This comparison shows that the polymerizable compositions according to the invention lend themselves particularly well to a prepolymerization by a photochemical route.

EXAMPLES 12 TO 17 AND COMPARATIVE EXAMPLES B AND C

Curable compositions were prepared by mixing the constituents shown in Table II in the indicated proportions by stirring at 40° C.

The curable compositions were then filled into a glass mould (−2.00 dioptries).

The thermally curable compositions were heated in the mould at 50° C. for 6 hours; 60° C. for 16 hours and 90° C. for 2 hours to give a polymer resin lens.

The photopolymerizable compositions were cured in the mould by UV irradiation (120 W/cm² from both sides) for 3 minutes at 120° C. to give a polymer resin lens.

After demoulding, the obtained lenses were annealed at 120° C. for 2 hours.

The yellow index of the lenses was determined. The results are given in Table II.

TABLE II

| Compounds (g) | Examples | | | | | | | |
|---|---|---|---|---|---|---|---|---|
| | 12 | 13 | 14 | 15 | 16 | 17 | B | C |
| a) BMATPS | 50 | 50 | 40 | 37 | 21 | 21 | 50 | 100 |
| BMATPS | — | — | — | — | 10 | 10 | — | 10 |
| b) EBADMA | — | — | 30 | 28 | 23 | 24 | — | — |
| DBADMA | 30 | 30 | — | — | — | — | — | — |
| OBADMA | — | — | — | — | 29 | 28 | — | — |
| BR₄BMBPP | — | — | — | — | — | — | 30 | — |
| c) BM | 20 | 20 | — | — | — | — | 20 | — |
| TBrEBA | — | — | 20 | 19 | 11 | 11 | — | — |
| d) BPOMA | — | — | 10 | 9.5 | — | — | — | — |
| e) PETG | — | — | — | 6.5 | — | — | — | — |
| TMTP | — | — | — | — | 6 | — | — | — |
| EGTG | — | — | — | — | — | 6 | — | — |
| Tinuvin P | 0.2 | 0.2 | — | — | — | — | 0.2 | — |
| V-65 | 0.2 | — | — | — | — | — | 0.2 | — |
| TPO | — | 0.07 | 0.07 | 0.07 | 0.06 | 0.07 | — | 0.07 |
| Irgacure ®184 | — | 0.035 | 0.035 | 0.035 | 0.03 | 0.035 | — | 0.035 |
| Curing | Thermal | UV | UV | UV | UV | UV | Thermal | UV |
| Yellow Index (YI) | | | | | | | | |
| before annealing | 1.25 | 1.21 | 1.44 | 1.05 | 1.32 | 1.3 | 2.14 | 2.63 |
| after annealing | 1.49 | 1.16 | 1.28 | 0.72 | 1.25 | 1.29 | 2.62 | 3.66 |
| Lens thickness at center mm | 1.30 | 1.30 | 1.30 | 1.30 | 1.35 | 1.30 | 1.30 | 1.30 |
| $n_d$ | — | — | — | — | 1.59 | 1.591 | — | — |
| $v_d$ | — | — | — | — | 40 | 35 | — | — |

| | |
|---|---|
| Br₄BMEPP | 2,2-bis(3,5-dibromodimethacryloxyethoxyphenyl)propane |
| PETG | Pentaerythritoltetrakisthioglycolate |
| EGTG | Ethylene glycol bisthioglycolate |
| Tinuvin P (UV Absorber) | 2-(2-hydroxy-5-methylphenyl)-benzotriazole |
| V-65 | 2,2-azobis(2,4-dimethylvaleronitrile) |

The examples show that compositions according to the present invention exhibit very low yellowness indices compared to compositions according to prior art. In particular, the compositions of the invention which include a polythiol compound (e) have exceptionally low yellow index values.

What is claimed is:

1. Composition comprising, based on the total weight of polymerizable monomers present in the composition:

a) 10 to 70% by weight of a difunctional thio(meth)acrylate monomer, of formula (I):

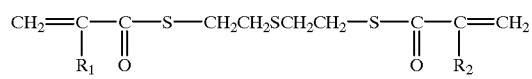

in which $R_1$ and $R_2$ denote a hydrogen atom or a radical —$CH_3$, or of a mixture of at least one monomer of formula (I) with at least one monomer of formula (II):

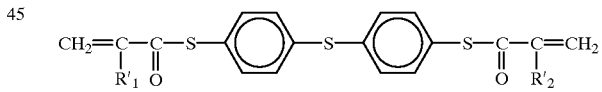

in which $R'_1$ and $R'_2$ denote a hydrogen atom or a radical —$CH_3$;

b) 10 to 60% by weight of at least one monomer of formula (III):

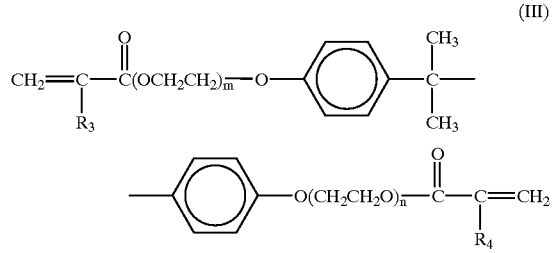

in which $R_3$ and $R_4$ denote a hydrogen atom or a radical —$CH_3$ and $0 \leq m+n \leq 10$; and c) 5 to 30% by weight of at least one aromatic or polycyclane mono(meth)acrylate monomer.

2. Polymerizable composition according to claim 1 further comprising up to 15% by weight of a polyalkylene glycol di(meth)acrylate.

3. Polymerizable composition according to claim 1, further comprising up to 15% by weight of a polythiol R(SH)$_n$, n is an integer which can assume the values from 2 to 6, R is an organic group of valency n, or a mixture of these polythiols.

4. Polymerizable composition according to claim 1, wherein the constituent a) represents 20 to 60% by weight of the polymerizable monomers present in the composition.

5. Polymerizable composition according to claim 1, wherein in the constituent a), the monomer(s) of formula (I) represent 50 to 100% by weight of the constituent a).

6. Polymerizable composition according to claim 1, wherein the constituents a) and b) together represent 60 to 95% by weight, relative to the total weight of the polymerizable monomers present in the composition.

7. Polymerizable composition according to claim 1, further comprising up to 10% by weight relative to the total weight of polymerizable monomers present of other polymerizable comonomers which do not impair the properties of the final polymer compositions.

8. Polymerizable composition according to claim 1, wherein the monomer of formula (I) is bis[(2-methacryloylthio)ethyl] sulfide.

9. Polymerizable composition according to claim 1, wherein the monomer of formula (II) is bis[(4-methacryloylthio)phenyl] sulfide.

10. Polymerizable composition according to claim 1 wherein constituent b) is chosen from ethoxybisphenol A dimethacrylate, diethoxybisphenol A dimethacrylate, poly(oxyethylene)bisphenol A dimethacrylate and mixtures thereof.

11. Polymerizable composition according to claim 1, wherein constituent c) is chosen from the monomers of formula (IV):

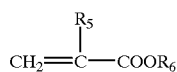

(IV)

in which R$_5$ denotes a hydrogen atom or a radical —CH$_3$, and R$_6$ is a radical o formula:

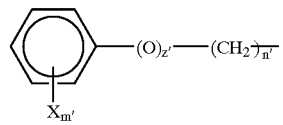

in which n' is an integer from 0 to 3, m' is an integer from 1 to 5, z' is equal to 0 or 1, on condition that z' is equal to 0 when n' is equal to 0 when n' is equal to 0 and x is a chlorine or bromine atom, or a mixture thereof.

12. Polymerizable composition according to claim 11 wherein constituent c) is chosen from cyclohexyl (meth)acrylate, methylcyclohexyl (meth)acrylate, (iso)bornyl (meth)acrylate, adamantyl (meth)acrylate, phenyl(meth)acrylate, benzyl (meth)acrylate, 1-naphthyl (meth)acrylate, fluorophenyl (meth)acrylate, chlorophenyl (meth)acrylate, bromophenyl (meth)acrylate, tribromophenyl (meth)acrylate, methoxyphenyl (meth)acrylate, cyanophenyl (meth)acrylate, biphenyl (meth)acrylate, bromobenzyl (meth)acrylate, tribromobenzyl (meth)acrylate, bromobenzylethoxy (meth)acrylate, tribromobenzylethoxy (meth)acrylate, phenoxyethyl (meth)acrylate and mixtures thereof.

13. Polymerizable composition according to claim 1 further comprising 0.001 to 10% by weight relative to the total weight of polymerizable monomers of a polymerization initiator.

14. Polymerizable composition according to claim 13, comprising 0.01 to 1% by weight of said initiator.

15. Polymerizable composition according to claim 13, wherein the polymerization initiator is a photoinitiator.

16. Polymerizable composition according to claim 15 wherein the photoinitiator is chosen from 2,4,6-trimethylbenzoyldiphenyl-phosphine oxide, 1-hydroxycyclohexyl phenyl ketone, 2,2-dimethoxy-1,2-diphenyletan-1-one, alkyl bezoin ethers and mixtures thereof.

17. Polymerizable composition, comprising, based on the total weight of polymerizable monomers present in the composition:

a) 10 to 70% by weight of a difunctional thio(meth)acrylate monomer, of formula (I):

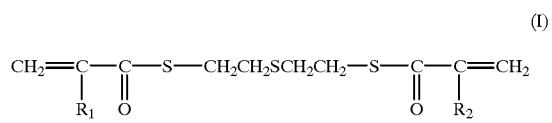

(I)

in which R$_1$ and R$_2$ denote a hydrogen atom or a radical —CH$_3$,
or of a mixture of at least one monomer of formula (I) with at least one monomer of formula (II):

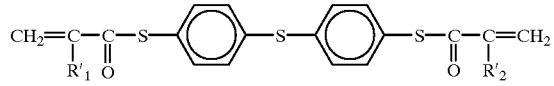

(II)

in which R'$_1$ and R'$_2$ denote a hydrogen atom or a radical —CH$_3$;

b) 10 to 60% by weight of at least one monomer of formula (III):

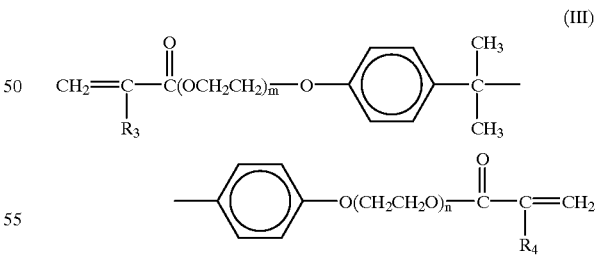

(III)

in which R$_3$ and R$_4$ denote a hydrogen atom or a radical —CH$_3$ and 0≦m+n10; and c) 5 to 30% by weight of at least one aromatic or polycyclane mono(meth)acrylate monomer, and e) 1 to 10% by weight of a polythiol R(SH)$_n$, where n is an integer from 2 to 6, R is an organic group of valency n, or a mixture of these polythiols.

18. Polymerizable composition according to claim 17, wherein n is 2 or 3.

19. Transparent polymer composition resulting from the polymerization of the polymerizable composition according to claim 1.

20. Transparent polymer composition resulting from the photopolymerization of a composition as defined in claim 15.

21. Optical article consisting of a polymer composition according to claim 19.

22. Polymerizable composition characterized in that it includes:

a) 10 to 70% by weight of a difunctional thio(meth)acrylate monomer, of formula (I):

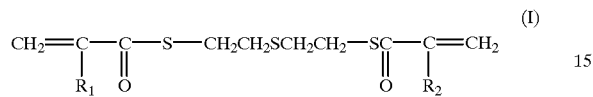

in which $R_1$ and $R_2$ denote a hydrogen atom or a radical —$CH_3$,
or of a mixture of at least one monomer of formula (I) with at least one monomer of formula (II):

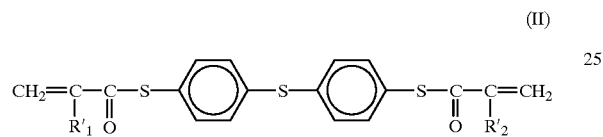

in which $R'_1$ and $R'_2$ denote a hydrogen atom or a radical —$CH_3$;

b) 10 to 60% by weight of at least one monomer of formula (III):

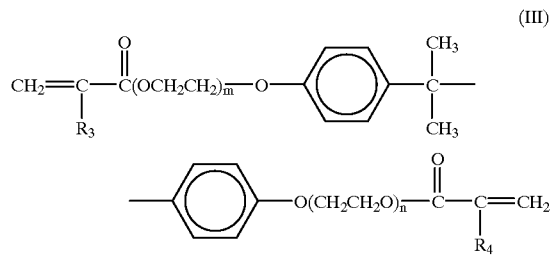

in which $R_3$ and $R_4$ denote a hydrogen atom or a radical —$CH_3$ and $0 \leq m+n 10$;

c) 5 to 30% by weight of at least one aromatic or polycyclane mono(meth)acrylate monomer;

d) 0 to 15% by weight of a polyalkylene glycol di(meth)acrylate; and e) 0 to 10% by weight of a polythiol $R(SH)_n$, n is an integer which can assume the values from 2 to 6, R is an organic group of valency n, or a mixture of these polythiols;

relative to the total weight of a)+b)+c)+d)+e).

* * * * *